United States Patent
Schilling (10) Patent No.: US 8,474,546 B2
(45) Date of Patent: *Jul. 2, 2013

(54) AGRICULTUAL IMPLEMENT INCORPORATING DISC OPENER APPARATUS

(75) Inventor: Robin B. Schilling, Darfield (CA)

(73) Assignee: CNH Canada, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,341

(22) Filed: Jul. 9, 2012

(65) Prior Publication Data

US 2012/0272879 A1    Nov. 1, 2012

Related U.S. Application Data

(62) Division of application No. 12/616,468, filed on Nov. 11, 2011, now Pat. No. 8,235,134.

(51) Int. Cl.
| | |
|---|---|
| A01B 49/06 | (2006.01) |
| A01B 63/26 | (2006.01) |
| A01B 71/02 | (2006.01) |
| A01B 79/02 | (2006.01) |
| A01B 23/06 | (2006.01) |
| A01B 71/08 | (2006.01) |

(52) U.S. Cl.
USPC ............ 172/420; 172/424; 172/429; 172/661; 172/744; 172/1; 111/135; 111/167; 111/194; 111/900

(58) Field of Classification Search
USPC .................... 111/163, 167, 194, 134–136, 62, 111/59, 52, 900; 172/395, 415, 418, 420, 172/423, 424, 429, 661, 613, 681, 734, 744, 172/1

See application file for complete search history.

(56) References Cited

U.S. PATENT DOCUMENTS

| | | | |
|---|---|---|---|
| 746,197 | A | 11/1903 | Kingsbury |
| 875,407 | A | 12/1907 | Bingaman |
| 2,738,969 | A | 3/1956 | Morris et al. |
| 4,307,674 | A | 12/1981 | Jennings et al. |
| 4,398,478 | A | 8/1983 | Frase et al. |
| 5,081,942 | A | 1/1992 | Clark et al. |
| 5,595,130 | A | 1/1997 | Baugher et al. |
| 6,347,594 | B1 | 2/2002 | Wendling et al. |
| 6,578,502 | B1 | 6/2003 | Barnstable et al. |
| 6,640,732 | B2 | 11/2003 | Prairie et al. |
| 6,895,876 | B2 | 5/2005 | Bergere et al. |
| 7,481,278 | B1 | 1/2009 | Pomedli et al. |
| 2008/0257238 | A1 | 10/2008 | Friesen |

FOREIGN PATENT DOCUMENTS

| | | |
|---|---|---|
| EP | 0980643 A2 | 2/2000 |
| FR | 2788657 A1 | 7/2000 |
| WO | WO 03/032707 A1 | 4/2003 |

*Primary Examiner* — Christopher J Novosad
(74) *Attorney, Agent, or Firm* — Rebecca Henkel (57) ABSTRACT

A packing pressure adjustment assembly for a ground opener unit of an agricultural implement includes a spring interconnected between a rotatable pressure adjustment arm and a trailing arm to which a packer wheel is rotatably mounted. The pressure adjustment arm is centered about an axle of the ground opener unit and is movable between a set of mounting positions that are defined by a set of teeth spaced and arced from one another along a frame portion of the ground opener unit. As the pressure adjustment arm is rotated, the amount of force exerted by the spring on the trailing arm is varied. The packing pressure adjustment assembly is relatively compact and is useful in providing high packing forces, such as a packing force in excess of 100 lbs.

9 Claims, 7 Drawing Sheets

AGRICULTUAL IMPLEMENT INCORPORATING DISC OPENER APPARATUS

CROSS-REFERENCE TO RELATED APPLICATION

The present application is a divisional of application Ser. No. 12/616,468 filed Nov. 11, 2011 now U.S. Pat. No. 8,235,134.

BACKGROUND OF THE INVENTION

The present invention relates generally to ground opener units for an agricultural implement and, more particularly, to an assembly for adjusting the packing pressure applied by a trailing packer wheel of a disc opener unit.

One type of planting implement is commonly equipped with one or more rows of discs or coulters carried by a tool bar, commonly referred to as a disc drill, which is towed by a tractor. Typically, an air cart, which holds seed and/or fertilizer, is also towed by the tractor and pneumatically supplies the individual disc openers with seed and/or fertilizer. The disc openers are attached to the disc drill frame by individualized arms or linkages which allow the disc openers to operate independently of another. This "independence" allows the discs to independently respond to changes in terrain and field obstructions.

Each disc has a generally flat construction that is rotated a few degrees, e.g., 7 degrees, about a vertical axis so that as the disc is pulled through the soil the leading surface of the disc displaces soil and creates a furrow in the soil. Downward pressure on the disc is provided by a spring or hydraulic cylinder to hold the disc at a desired furrowing depth, e.g., desired seeding depth. The depth at which the disc cuts the furrow into the soil is controlled by a gauge wheel that runs in relative close proximity to the disc. In addition to its depth controlling function, for some disc drills, the placement of the gauge wheel close to the disc also assists in keeping the disc surface clean of soil, mud, or debris buildup. Also, the gauge wheel rides over the soil displaced by the disc as the furrow is being cut to prevent the displaced soil from being thrown.

The disc cuts a furrow or trench in the soil into which seed and/or fertilizer is deposited. The seed and/or fertilizer is dropped through a tube into the trench, and the disc holds the trench open on one side and a disc scraper blade holds it open on the opposite side. The trench walls then collapse onto the seed and/or fertilizer when the disc and scraper blade pass. A trailing wheel then packs the soil atop the seed and/or fertilizer.

Most disc drills include a torsion spring that is used to bias the trailing (packer) wheel against the field or planting surface. While generally effective in holding the packer wheel down against the planting surface, such torsion springs are generally unable to create high packing forces, such as those greater than 100 lbs. Additionally, for many disc drills, the placement of the torsion spring is such that the spring is prone to collect field trash and other debris.

SUMMARY OF THE INVENTION

The present invention is directed to a packer wheel assembly overcoming the aforementioned drawbacks. The invention provides a compact packer wheel pressure adjustment assembly having an adjustment arm that can be rotated to one of multiple positions to change the amount of packing pressure exerted by the packer wheel. The adjustment arm interfaces with a biasing member, such as a spring, that adjusts the amount of packer wheel pressure as a function of the position of the adjustment arm. The multiple positions at which the adjustment arm can be engaged correspond to a range of desirable packer wheel pressures, including a position that results in excess of 100 lbs of packer wheel pressure.

It is therefore an object of the invention to provide a compactly designed packer wheel pressure adjustment assembly.

The invention also advantageously provides a biasing spring capable of providing packing pressures in excess of 100 lbs.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
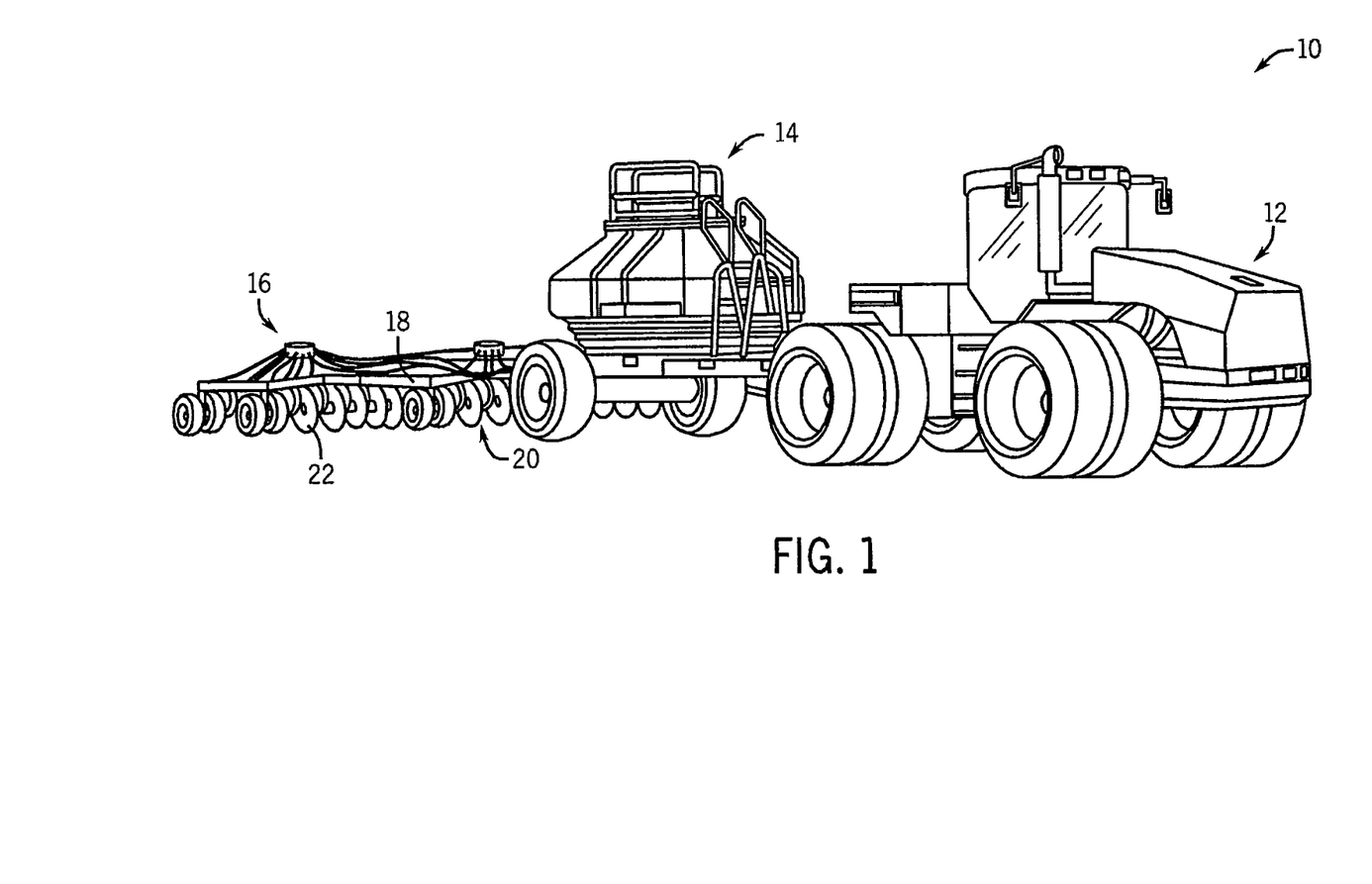
FIG. 1 is a pictorial view of an agricultural system generally comprised of tractor, an air cart, and a disc drill having a set of disc openers.

Referring now to the drawings, and more particularly to FIG. 1, an agricultural planting system 10 is shown and, as known in the art, is generally comprised of a tractor 12, an air cart 14, and a planter 16. The air cart 14 and the planter 16 are hitched to the tractor 12 in a conventional manner. The planter 16 includes a tool bar 18 to which a set of disc opener units 20 are coupled. The disc opener units 20 each include a disc 22 designed to cut a furrow into the soil. As known in the art, the air cart 14 pneumatically delivers seed and/or fertilizer to a set of delivery tubes (not shown) of the planter 14 whereupon the seed and/or fertilizer is deposited in seed trenches or furrows cut by the discs 22.

Figure 2:
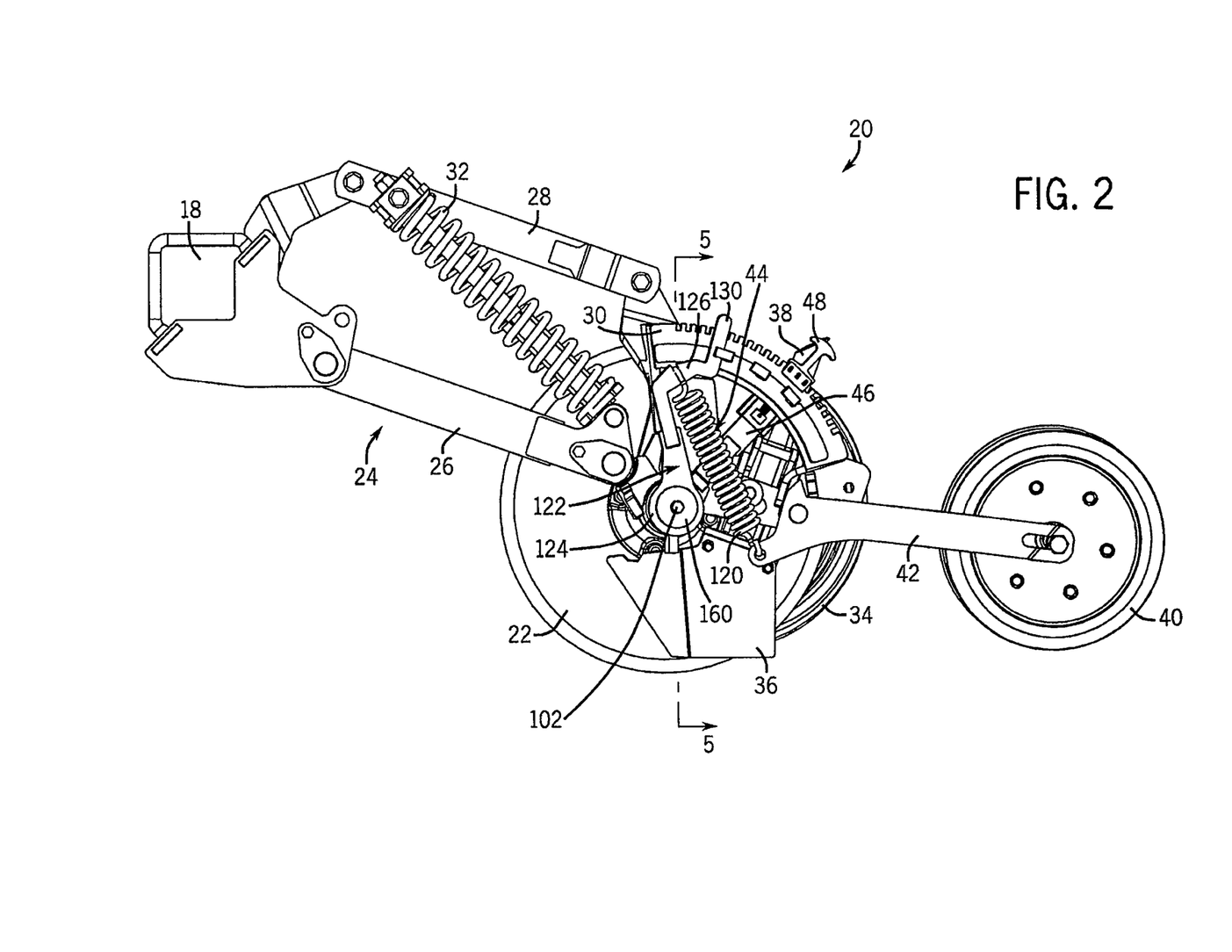
FIG. 2 is a side elevation view of a disc opener unit of the disc drill of FIG. 1.

An exemplary disc opener unit 20 is shown in FIG. 2. Each disc opener unit 20 includes a linkage assembly 24 that in the illustrated unit includes links 26, 28 that are coupled to the tool bar 18 in a known manner at one end and connected to an opener frame 30 at the opposite end. The opener unit 20 includes a spring 32 that applies downward pressure on the disc 22. Alternately, a hydraulic cylinder may be used to apply such downward pressure. Disc penetration is controlled by a gauge wheel 34 that is positioned in relative close proximity to the disc 22. In addition to controlling the penetration depth of the disc 22 the gauge wheel 34 also helps in keeping the adjacent side of the disc 22 clear of debris. A scraper blade 36 is provided on the opposite side of the disc 22 to keep the leading face of the disc 22 clear of soil, mud, and debris. In one preferred embodiment, the disc 22 is angled at an offset of approximately 7 degrees from vertical; although, different orientations are contemplated. The leading side of the disc 22 displaces soil and creates a furrow in the soil as the disc 22 is pulled through the soil by the tractor 12. In addition to providing a scraping function the scraper blade 36 also helps to hold the furrow open as seed and/or fertilizer is deposited into the furrow.

The disc opener unit 20 also carries a seed tube 38 that is flow-coupled to the air cart 14. As known in the art, seed and/or fertilizer is provided to the seed tube 38 which drops the seed and/or fertilizer into the furrow. A trailing wheel 40, coupled to the frame 30 by arm 42, packs the furrow after the seed and/or fertilizer has been deposited. The amount of packing pressure applied by the trailing wheel 40 is controlled by a packing pressure adjustment assembly 44, which will be described in further detail below.

Figure 3:
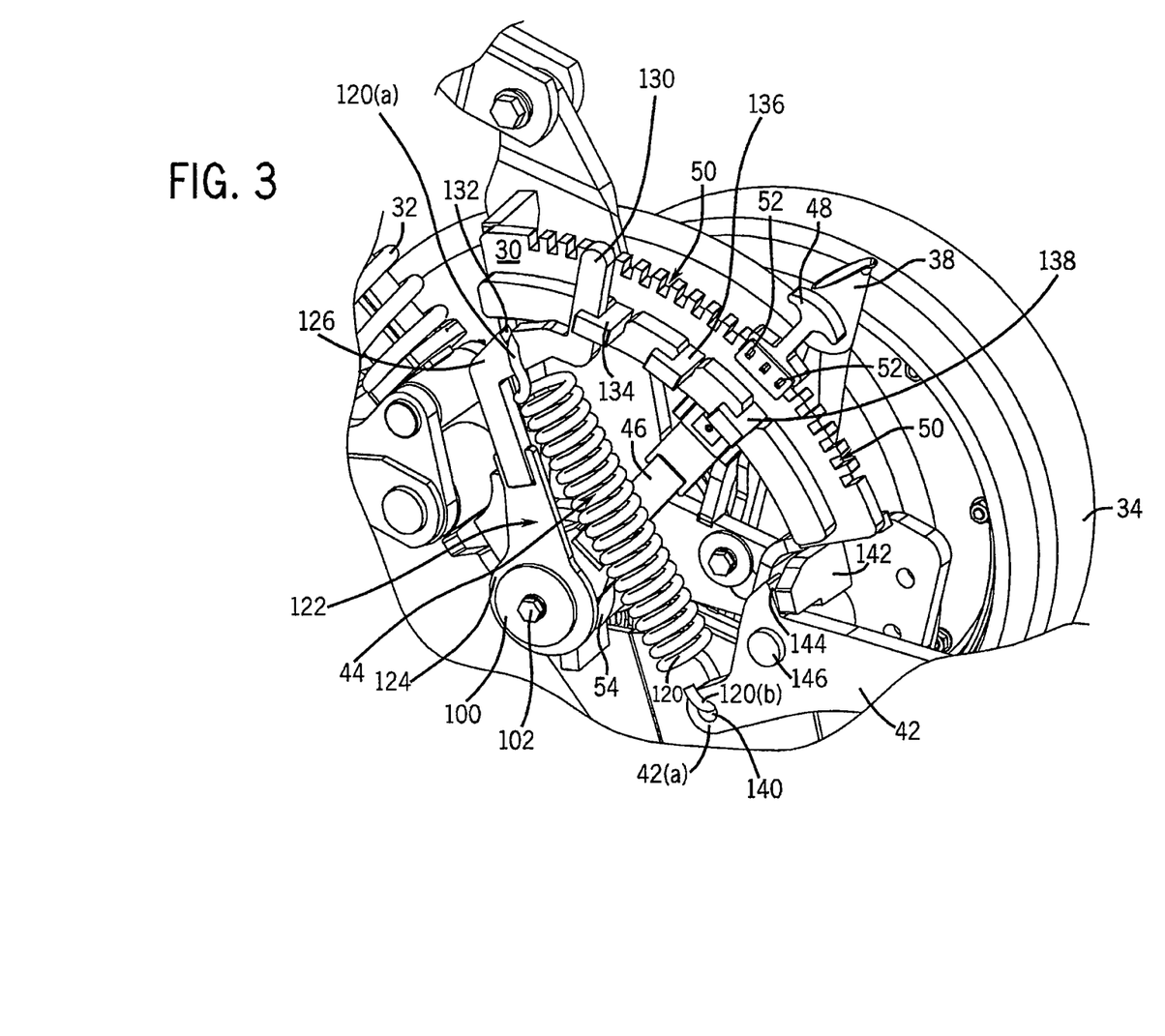
FIG. 3 is an enlarged isometric view of a portion of the disc opener unit of FIG. 2.

As noted above, the gauge wheel 34 controls the penetration depth of the disc 22. The gauge wheel 34 may be raised or lowered by rotation of a depth adjustment arm 46. Arm 46, which includes a generally T-shaped handle 48, may be rotated by a user pulling upward on handle 48. As shown in FIG. 3, the frame 30 includes an arc of notches 50 that define a range of discrete engagement points at which the handle 48 may be positioned. In one preferred embodiment, the notches 50 allow the gauge wheel 34 to set the penetration depth between 3.2 mm and 87 mm. The handle 48 has teeth 52 that are received by a selected number of the notches 50 to position the handle 48, and thus the arm 46, at a desired position. The arm 46 is coupled to a spindle 54 that as described below also carries the gauge wheel 34 and the disc 22. As such, rotation of the arm 46 between the discrete positions varies the position of the gauge wheel 34 and thus the penetration depth of the disc 22.

Figure 4:
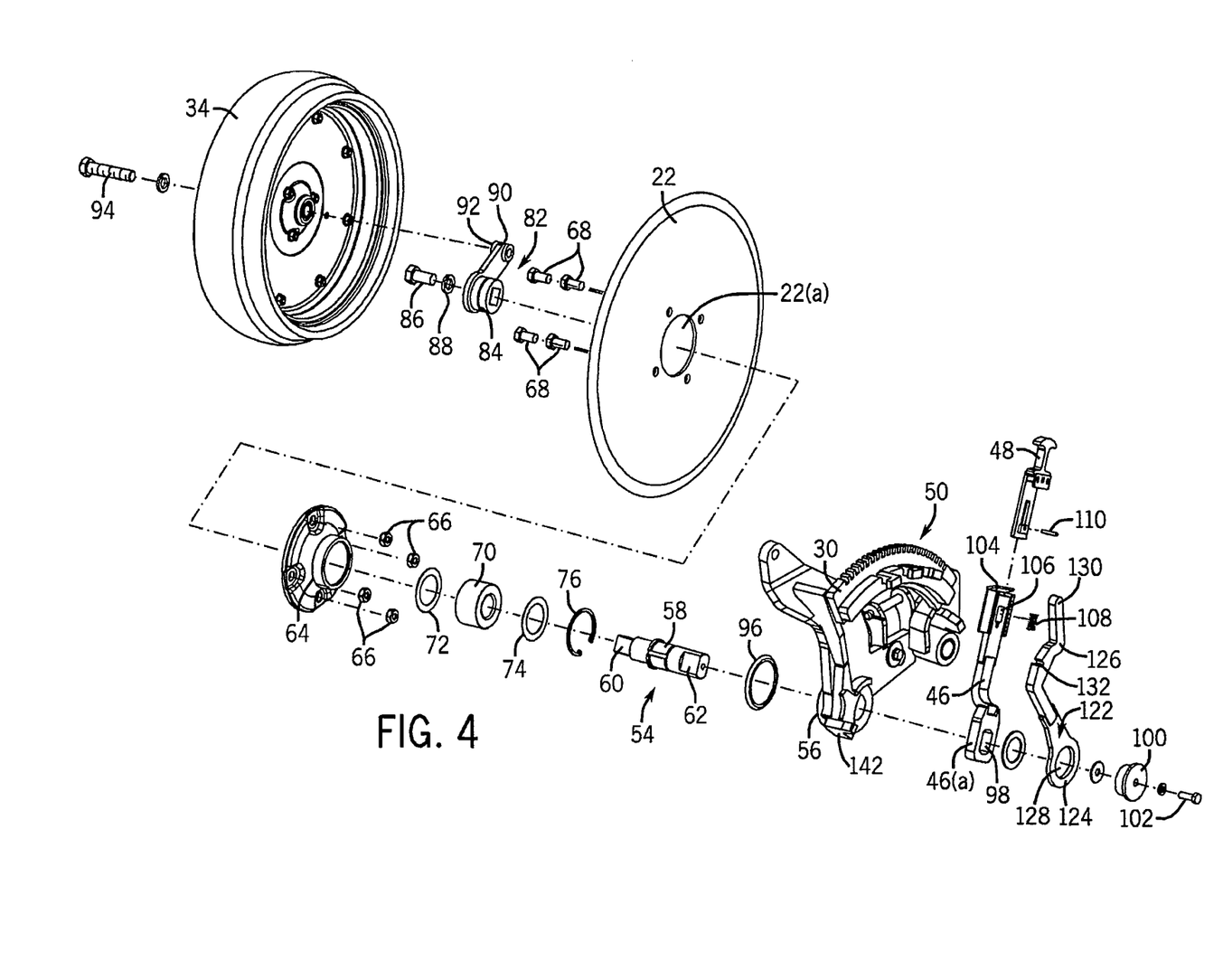
FIG. 4 is a exploded view of the disc opener unit of FIG. 2.
Figure 6:
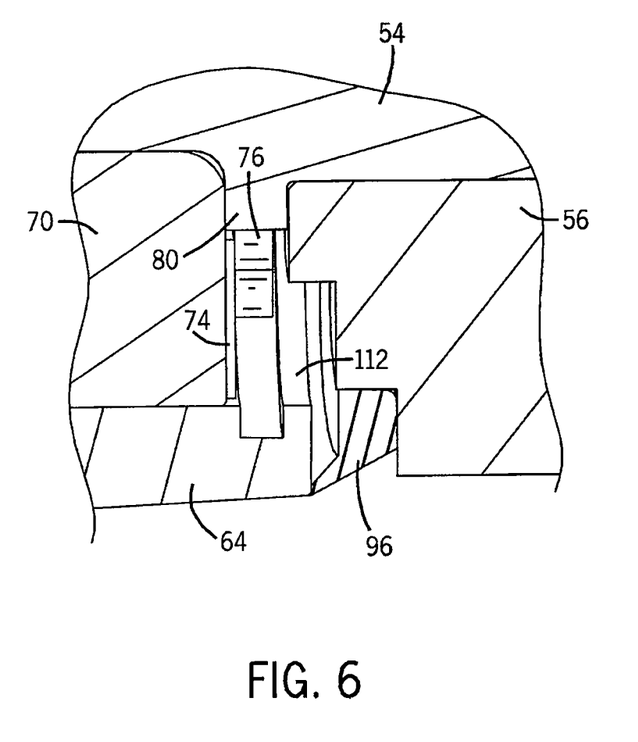
FIG. 6 is an enlarged section view of the disc opener unit taken along line 6-6 of FIG. 5.

To better illustrate the design of the disc opener unit 20 reference is now made to FIG. 4, which provides an exploded view of a portion of the disc opener unit 20. The frame 30 includes a generally cylindrical sleeve 56 into which spindle 54 is received. With additional reference to FIG. 8, the spindle has a body 58 defined between a first end 60 and a second end 62. The disc 22 is mounted to a hub 64 using nuts 66 and bolts 68 in a conventional manner. The hub 64 has a bearing 70 pressed into it with a pair of washers 72, 74 and a snap ring 76 operative as a retainer. While different types of bearings are contemplated, bearing 70 preferably has a split inner race. Each inner half is placed from each side and clamped together. When clamped, a correct internal clearance is provided. The hub 64, bearing 70, washers 72, 74, and snap ring 76 collectively define a hub assembly 78 that is slid onto end 60 of the spindle 54. As best shown in FIG. 6, the spindle 54 has a shoulder 80 that provides a defined stop for the hub assembly 78. In this regard, the hub assembly 78 is slid onto the spindle 54 until the inner race of the bearing abuts the shoulder 80.

As described above, the disc 22 is fastened to the hub 64. It is understood that the disc 22 could be mounted to the hub before or after the hub assembly is placed onto the spindle 54. With the disc 22 secured to the hub 64 and the hub assembly 68 placed over the first end 60 of the spindle 54, a gauge arm 82 may be secured to the first end 60 of the spindle 54. More particularly, the gauge arm 82 has a first end 84 that is passed through central opening 22(a) of the disc 22 and the hub assembly 78 into engagement with the first end 60 of the spindle 54. In one preferred embodiment, the first end 60 of the spindle 54 and the first end 84 of the gauge arm 82 have complimentary shapes, e.g., square, to facilitate a quick and correct coupling. A bolt 86 and washer 88 are then used to secure the gauge arm 82 to the spindle 54.

The second end 90 of the gauge arm 82 is coupled to a gauge wheel spindle 92 to which the gauge wheel 34 is mounted using bolt 94. The gauge wheel 34 is mounted to the gauge wheel spindle 92 in a manner that allows the gauge wheel 34 to rotate around the gauge wheel spindle 92. Preferably, after the disc 22, hub assembly 78 and gauge wheel 34 have been secured to the spindle 54, the second end 62 is passed through a v-ring seal 96 and sleeve 56 of frame 30. The second end 62 of the spindle 54 extends past the sleeve 56 and passes through an opening 98 formed in a lower end 46(a) of the depth adjustment arm 46. A collar 100 together with a bolt 102 are used to secure the depth adjustment arm 46 to the spindle 54 and secure the spindle 54 to the frame 30.

As further shown in FIG. 4, the depth adjustment arm 46 includes an upper end 104 having a pocket 106 for a compression spring 108. The upper end 104 is secured to the depth adjustment handle 48 by a roll pin 110. The compression spring 108 functions to keep the teeth 52 of the handle 48 engaged with selected notches 50. In this regard, a user must pull on the handle 48 sufficiently to overcome the compressive force of the spring 108 to disengage the teeth 52 from the notches 48 and rotate the arm 46 to a new position along the arc of notches 50. Once the pulling force is removed, the compressive force of the spring 108 draws the handle 48 toward the spindle 54 (axis of rotation for the disc 22) and engages the teeth 52 with the notches 50.

Figure 5:
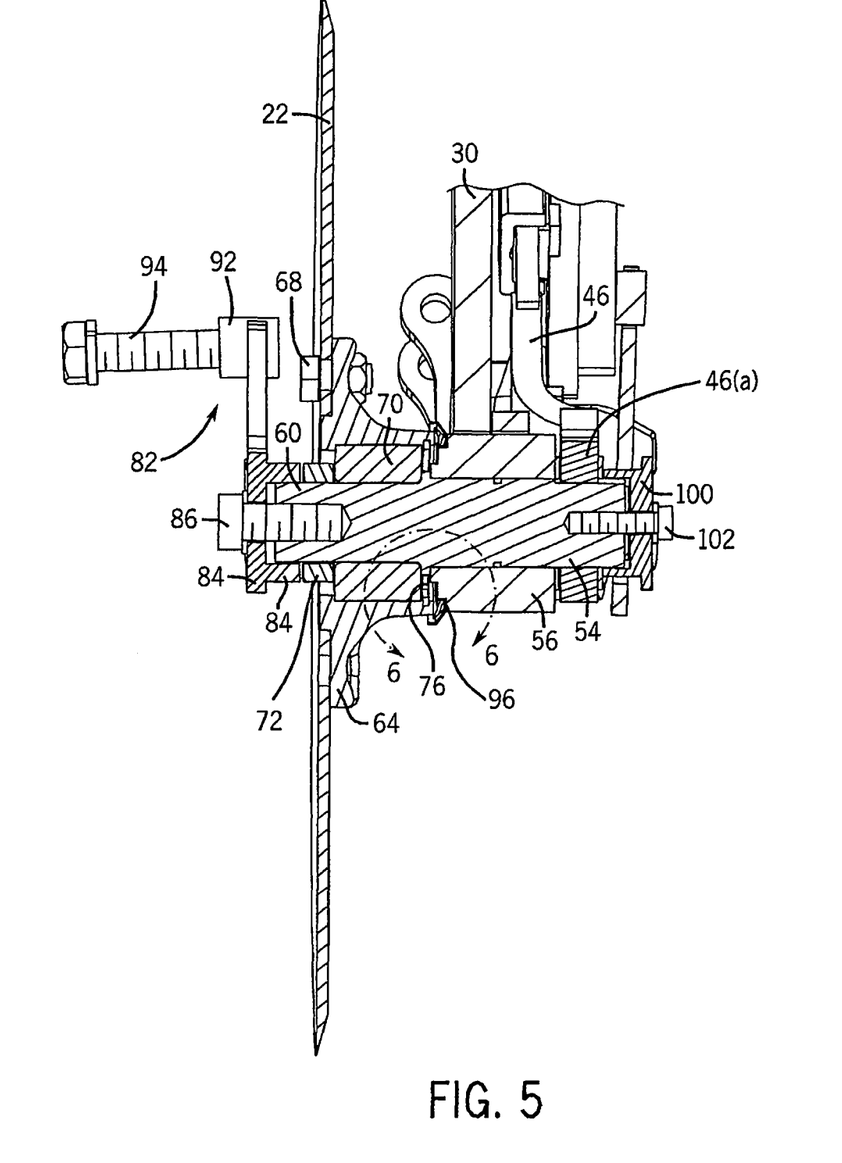
FIG. 5 is a section view of the disc opener unit taken along line 5-5 of FIG. 2.

FIG. 5 provides a section view of the disc opener unit 20 taken along line 5-5 of FIG. 2. As illustrated, the spindle 54 defines an axis of rotation for the disc 22 as well as the gauge wheel arm 82 and the depth adjustment arm 46. As further illustrated in FIG. 5, the gauge wheel spindle 92 is offset from spindle 54 but rotates with spindle 54. In this regard, the spindle 54 acts as a crankshaft for the gauge wheel arm 82 such that as the gauge wheel arm 82 is rotated the gauge wheel 34 is rotated albeit along an axis offset but parallel to the axis of rotation for the spindle 54.

Figure 7:
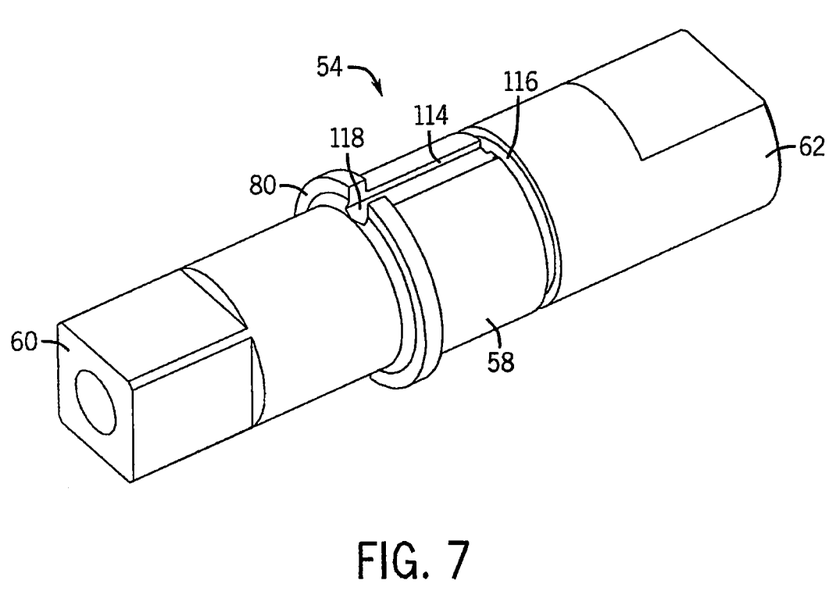
FIG. 7 is an isometric view of the spindle of the disc hub assembly of FIG. 4.

As noted above and with additional reference to FIG. 6, a v-ring seal 96 is provided that is used to create a grease pocket, illustrated at reference numeral 112, between the face of the bearing 70 and the frame 30. The grease zerk is located on the outside of the frame 30 and is needed for rotation of the spindle 54 when a depth adjustment is made. Referring again to FIG. 7, a grease channel 114 is formed along the body 58 of the spindle 54. The grease channel 114 is formed generally parallel to the long axis of the spindle body 58. An annular grease grove 116 is formed in the elongated body 58 between the grease channel 114 and end 62 of the spindle 54. As further illustrated in FIG. 7, the grease channel 114 communicates with a cutout 118 formed in the shoulder 80 and is positioned between the shoulder 80 and end 62 of the spindle 54.

As noted above, the present invention also provides a packing pressure adjustment assembly 44. As will be made apparent from the foregoing description, the packing pressure adjustment assembly 44 has a compact design, is capable of providing high packing pressures, e.g., 100 lbs, and is less prone to debris, mud, and field trash collection than conventional assemblies commonly used to adjust the amount of packing pressure provided by the packer wheel 40. With reference again to FIGS. 2-4, the pressure adjustment assembly 44 is comprised of a spring 120 that is interconnected between an adjustment arm 122 and the trailing arm 42. The adjustment arm 122 has a lower portion 124 and an upper portion 126. As shown in FIG. 4, the lower portion 124 has an opening 128 though which the end 62 of the spindle 54 is passed. In this regard, the lower portion 124 of the adjustment arm 122 is secured to the spindle 54 by collar 100 and fastener 102.

The upper portion 126 of the adjustment arm 122 has a handle member 130 that has a generally L-shaped body. A groove 132 is formed in the upper portion 126 of the adjustment arm 122 and is designed to receive a first end 120(a) of the spring 120. In a preferred embodiment, the first end 120(a) of the spring 120 is a downwardly facing hook that is dropped into the groove 132 and held in the groove 132 by the tension in the spring 120. The adjustment arm 122 is movable between a set of defined positions that are defined by engagement members 134, 136, and 138 formed on the opener frame 30. The engagement members 134-136 are radially spaced from one another so as to have an arc shaped arrangement. The radius of the arc is centered about the axis of rotation of the spindle 54. Each engagement member 134-136 is L-shaped and includes axially extending portion and a forwardly extending portion. The shape of the engagement members 134-136 results in a respective gap being formed between the forwardly extending members and the side of the opener frame 30. The handle member 130 is designed to be secured to the engagement members by seating the handle member 130 against a gap-side surface of the axially extending portions of the engagement members 134-136. The gaps are each sized so that the handle portion is snuggly received and held therein.

The opposite end 120(b) of the spring 120 is secured to a forward end 42(a) of the trailing packer wheel arm 42. More particularly, a hole 140 is formed in the forward end 42(a) of the arm 42 and the end 120(b) of the spring 120 has a upwardly facing hook that is passed through the hole 140. Tension in the spring 120 retains the hook end 120(b) in the hole 140.

Referring again to FIG. 3, a stop bar 142 extends laterally from the frame 30. The trailing packer arm 42 includes an engagement surface 144 that abuts against the stop 142. The amount of packing force applied by the packer wheel 40 is adjusted by changing the position of the adjustment arm 122. When the arm 122 is rotated in a forward direction (counter clockwise direction in FIG. 3), the spring 120 is elongated. This elongation of the spring 120 causes the spring 120 to pull up on the leading end 42(a) of arm 42. This movement causes the arm 42 to rotate in a rearward direction (clockwise direction in FIG. 3) about pin 146, which couples the packer arm 42 to the opener frame 30. As a result, the engagement surface 142 is brought into greater engagement with the stop bar 142. Stated another way, the increased tension in the spring 120 created as the spring 120 is elongated results in a greater holding force of the trailing arm 42 against the stop bar 142, which increases the amount of packing force applied by the packer wheel 40.

Conversely, when the adjustment arm 122 is rotated rearwardly (clockwise in FIG. 3), the amount of tension in spring 120 is lessened thereby reducing the force used to hold the trailing arm 42 against stop bar 142. As such, less packing pressure is applied by the wheel 40. In a preferred embodiment, the adjustment arm 122 can be positioned at three different positions (defined by engagement members 134, 136, 138), but it is contemplated that more or less positions could be defined.

It will therefore be appreciated that the present invention provides a compact packer wheel pressure adjustment assembly having an adjustment arm that can be rotated to one of multiple positions to change the amount of packing pressure exerted by the packer wheel. A spring is provided; although, other types of biasing devices could be used, such as a cylinder, that adjusts the amount of packer wheel force as a function of the position of the adjustment arm. The multiple positions at which the adjustment arm can be engaged correspond to a range of desirable packer wheel pressures, including a position that results in excess of 100 lbs of packer wheel force.

Many changes and modifications could be made to the invention without departing from the spirit thereof. The scope of these changes will become apparent from the appended claims.

I claim:

1. An agricultural implement comprising:
a toolbar adapted to be coupled to a prime mover; and
a plurality of ground opener units mounted to the toolbar, wherein each of the ground opener units comprises a frame adapted to be mounted to the tool bar, an axle carried by the frame, a disc rotatably mounted to the axle and adapted to cut a furrow into a planting surface, a set of pressure setting engagement members formed on a portion of the frame, a packer wheel coupled to the frame by a packer wheel arm, a packer pressure adjustment assembly mounted to the frame and adapted to exert a pressure on the packer wheel arm, wherein an amount of pressure exerted on the packer wheel arm by the packer pressure adjustment assembly is set based on which of the pressure setting engagement members the packer pressure adjustment assembly is engaged, wherein the packer pressure adjustment assembly includes a packer pressure adjustment arm coupled to the axle and adapted to be selectively engaged with the set of pressure setting engagement members at a user selected one of a plurality of packing pressure positions, and a linear spring interconnected between the packer pressure adjustment arm and the packer wheel arm, and configured to exert a force on the packer wheel arm dependent upon the user selected packing pressure a position of the packer pressure adjustment arm.

2. The implement of claim 1 wherein the packer pressure adjustment arm has a first end loosely engaged with the axle and a second end adapted to engage the pressure setting engagement members, wherein the first end is adapted to allow rotation of the packer pressure adjustment arm about the axle.

3. The implement of claim 2 wherein the first end of the packer pressure adjustment arm includes a collar defining an orifice, wherein the axle is received through the orifice.

4. The implement of claim 3 wherein the collar is mounted on the axle in a manner that allows limited axial displacement of the collar along the axle.

5. The implement of claim 2 wherein the second end of the packer pressure adjustment arm includes a handle portion.

6. The implement of claim 1 wherein the set of pressure setting engagement members includes a set of teeth formed in a spaced and arced arrangement along the portion of the frame, and wherein the packer pressure adjustment arm includes a tooth engagement portion adapted to selectively engage each tooth of the set of teeth.

7. The implement of claim 1 wherein the packer wheel arm has a first end pivotably mounted to the frame and a second end to which the packer wheel is rotatably mounted, and wherein the spring exerts a pulling force on the first end of the packer wheel arm such that as the first end of the packer wheel arm is pulled upward, the second end of the packer wheel arm is lowered.

8. A method of adjusting the packing pressure of a packer wheel of a ground opener unit, comprising:
- disengaging a packer wheel adjustment arm from an engagement member formed on an accessory mount of the ground opener unit;
- rotating the packer wheel adjustment arm along an axis of rotation, wherein the axis of rotation is shared with an axis of rotation of a disc opener of the ground opener unit; and
- engaging the packer wheel adjustment arm with a new engagement member at a user selected one of a plurality of packing pressure positions; said new engagement member formed on the accessory mount of the ground opener unit, wherein rotation of the packer wheel adjustment arm causes compression or extension dependent upon the user selected packing pressure of a linear spring interconnected between the packer wheel adjustment arm and a packer wheel arm that couples the packer wheel to the accessory mount.

9. The method of claim 8 wherein rotating the packer wheel adjustment arm away from the packer wheel increases the packing pressure of the packer wheel and wherein rotating the packer wheel adjustment arm toward the packer wheel decreases the packing pressure of the packer wheel.

* * * * *